Aug. 14, 1951 H. A. PEARSE 2,563,955
MIXING AND DIVERTER VALVE
Filed Sept. 16, 1946 2 Sheets—Sheet 2
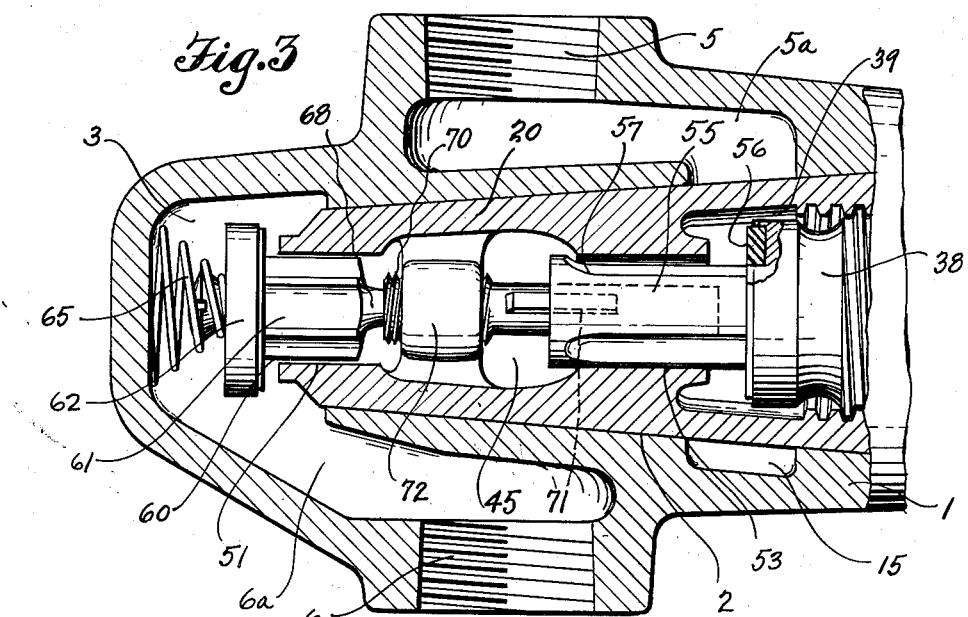
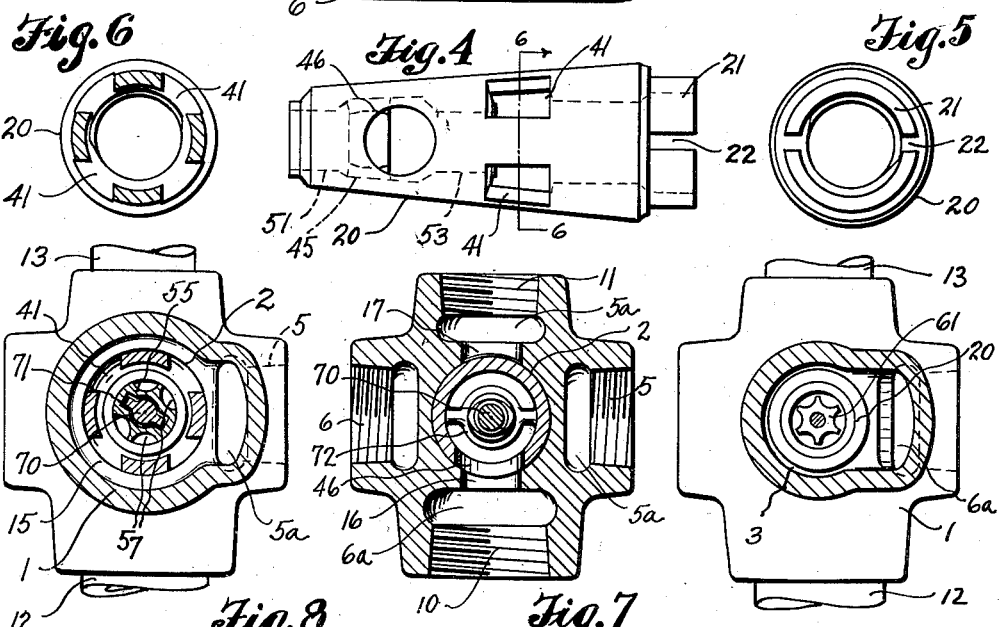
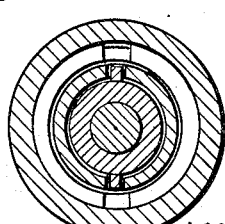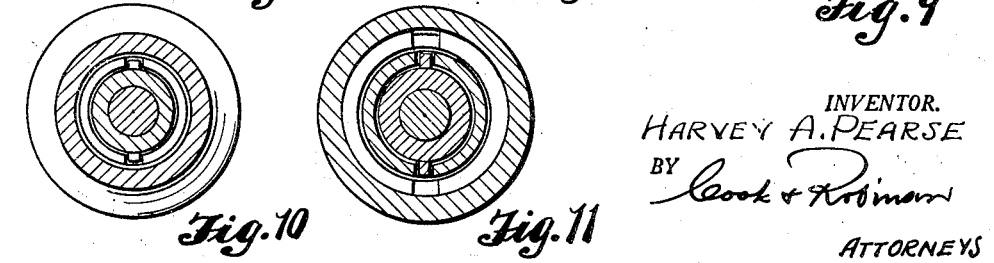
INVENTOR.
HARVEY A. PEARSE
BY Cook & Robinson
ATTORNEYS Patented Aug. 14, 1951

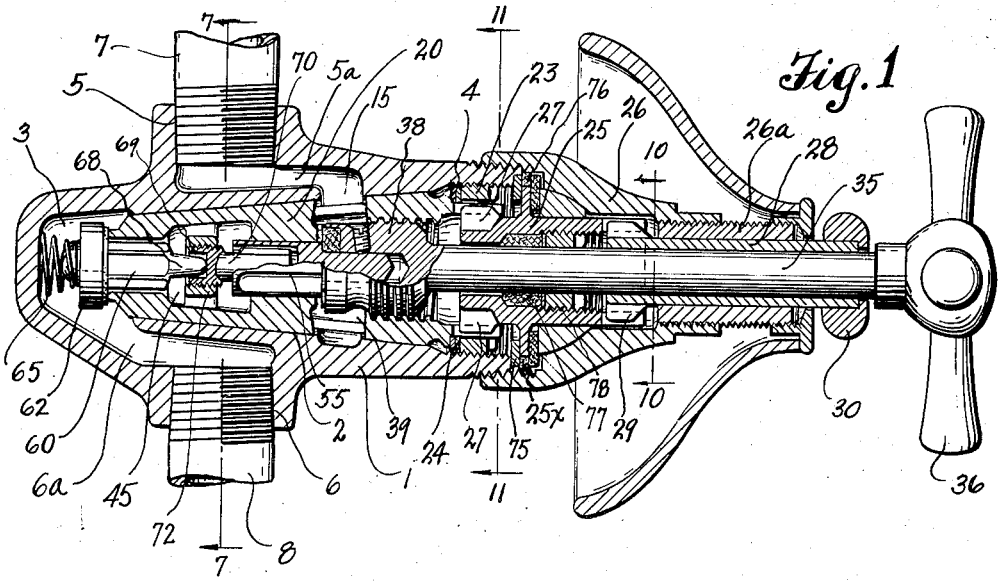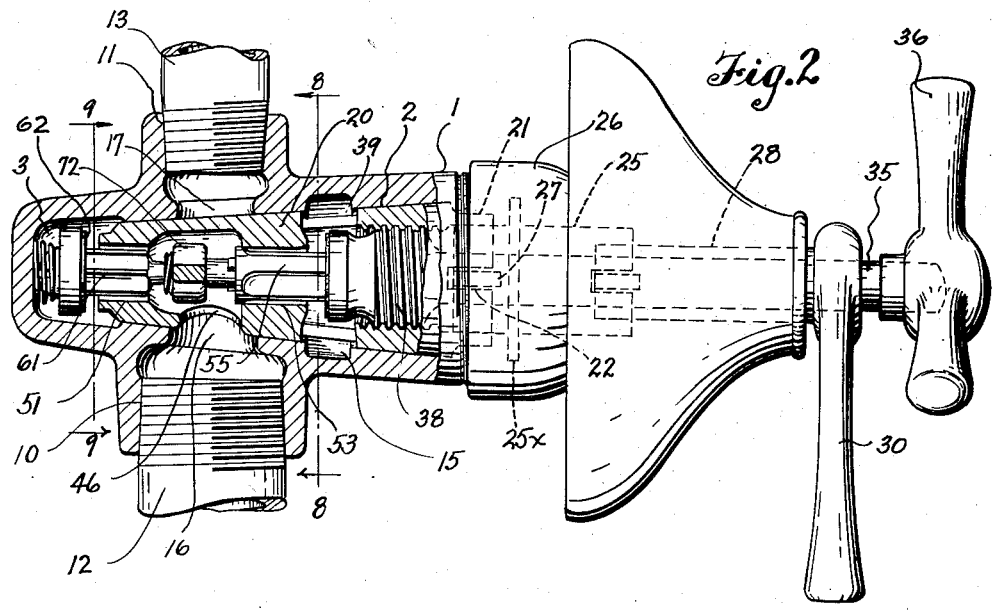

2,563,955

UNITED STATES PATENT OFFICE 2,563,955

MIXING AND DIVERTER VALVE

Harvey A. Pearse, Seattle, Wash.

Application September 16, 1946, Serial No. 697,310

6 Claims. (Cl. 277—7)

This invention relates to valve structures and it has reference more particularly to improvements in what are known in the art to which the invention pertains as mixing and diverting valves and which are especially designed for use in connection with tub bath and shower bath fixtures.

It is the principal object of my invention to provide a valve mechanism whereby hot and cold water may be mixed in various proportionate amounts ranging from all cold to all hot water, and whereby the mixture may be diverted from one point of use to another and vice versa.

It is also an object of this invention to provide a mixing and diverting valve mechanism, as above stated, wherein the flow of water mixture through the valve housing may be increased or decreased without changing the proportionate amounts of hot and cold water which make up the mixture, thus to provide for varying the volume without change in temperature.

Still another object of the invention is to provide a mixing valve mechanism so constructed that upon initially opening the valve, cold water will always be admitted first thus to insure against any possible injury or discomfort to a person by reason of a sudden discharge of hot water.

It is also an object of the invention to provide means in connection with the valve mechanism for temporarily shutting off the flow of water therethrough without affecting an adjustment made for producing a mixture of certain temperature.

Still further objects of the invention reside in the details of construction of various parts, in the combination of parts, and mode of operation of the mechanism as will hereafter be fully described.

In accomplishing these and other objects of the invention I have provided the improved details of construction, the preferred forms of which are illustrated in the accompanying drawings, wherein, Fig. 1 is a central, longitudinal section of a mixing and diverting valve mechanism embodied by the present invention, showing its connection with hot and cold water supply pipes.

Fig. 2 is a similar longitudinal section of the valve mechanism taken in a plane at a right angle to that of the section of Fig. 1, showing pipe connections for diverting flow to tub and shower fixtures.

Fig. 3 is an enlarged longitudinal section of a part of the valve housing and valve plug with hot and cold water valves contained therein.

Fig. 4 is a side view of the valve plug.

Fig. 5 is an end view of the same.

Fig. 6 is a cross section taken on the line 6—6 in Fig. 4.

Fig. 7 is a cross sectional view of the valve housing on line 7—7 in Fig. 1.

Figs. 8 and 9 are cross sectional views taken respectively on the line 8—8 and 9—9 in Fig. 2.

Fig. 10 is a cross section on the line 10—10 in Fig. 1.

Fig. 11 is a cross section on the line 11—11 in Fig. 1.

Referring more in detail to the drawings—

The main valve housing is designated by reference numeral 1 and it is shown as being formed with an elongated, conically tapered bore 2 which, at its smaller end, opens into a chamber 3, referred to as the hot water chamber. Leading into the housing side walls, near its smaller end and at diametrically opposite sides thereof, are passages 5 and 6 which are internally threaded for the reception, respectively, of a cold water supply pipe 7 and a hot water supply pipe 8, as shown in Fig. 1. Likewise, formed at opposite sides of the valve housing and intermediate the points of connection of hot and cold water supply pipes, are outlets 10 and 11 which are internally threaded as seen in Fig. 2, for the reception of pipes 12 and 13 which, respectively, are designed to lead to the bath tub and shower head.

It is to be observed in Fig. 1 that the inner end of the cold water passage 5 is connected directly by a channel 5a with an annular channel 15 that is formed about the inside surface of the bore 2 near its larger end as shown in Figs. 2 and 8. Likewise, the inlet passage 6 communicates, through a channel 6a, with the chamber 3. In Figs. 2 and 7, it is shown that the outlets 10 and 11 communicate directly with openings 16 and 17 which open into the bore 2 at diametrically opposite sides and near its small end.

Rotatably fitted in the bore 2 is a valve plug 20, the smaller end portion of which extends just slightly within the chamber 3 while the larger end portion terminates within the opposite end of the bore. The plug has a passage from end to end, and at its larger end terminates in an annular flange 21 that is formed with a cross slot 22 as observed best in Figs. 4 and 5. The plug 20 is held seated in the bore 2 by means of a collar 23 that is threaded into the end of housing 1 at the larger end of the plug, and a fiber gasket 24 is located between this collar and the end of the plug.

Extended into the flanged end of the plug is the inner end portion of a spud 25 of tubular form having its inner end portion rotatably contained in the larger end of the bore of the valve housing coaxially thereof. The outer end portion of the spud 25 is contained within a fitting 26 that is threaded onto the housing 1. The inner end portion of the spud has two laterally extending wings 27 thereon, shown in Fig. 1, that are contained for limited endwise movement in the flange slots 22 of the plug.

Extended into the housing through a nipple 26a that is threaded into the outer end portion of the fitting 26 as seen in Fig. 1, is a tubular stem 28 which at its inner end has a splined connection as at 29 in Fig. 1 with the outer end portion of the spud. At its outer end the tubular stem 28 has a hand lever 30 fixed thereon by means of which the stem and the spud may be rotated thus through the splined connection of the spud with the plug to effect the rotatable adjustment of the latter.

Rotatably contained within the tubular stem 28, and extended coaxially through the spud 25 and beyond the inner end thereof is a valve adjusting stem 35. This is equipped at its outer end with a handle 36 whereby it may be rotated and at its inner end has an exteriorly threaded nut 38 integral therewith and which nut is threaded into the larger end of the valve plug in a right hand thread. The arrangement of parts is such that by rotating the handle 36, the valve nut 38 will be rotated and by reason of its rotation will be adjusted in the longitudinal direction of the plug. By rotation in opposite directions, the adjustment will be in opposite directions.

It is shown in Figs. 1 and 2 that the inner end portion of the valve nut 38 extends into a cored out chamber 39 in the plug referred to as the cold water chamber, which is in direct communication with the annular passage 15 formed in the valve housing about the plug; there being four passages 41 in the plug wall at equally spaced intervals thereabout, as shown best in Figs. 4 and 6 that open from the cold water chamber 39 into the channel 15.

Formed within the plug in the smaller end portion thereof, is a mixing chamber 45, and opening laterally therefrom, is a hole, or passage 46, which is adapted by rotatable adjustment of the plug to be brought into registration with one or the other of the holes or passages 16 and 17 thus to provide for the outflow of water from the mixing chamber 45 to either the pipe leading to the shower head or that leading to bath tub. Bored in the smaller end portion of the plug 20 is a coaxial passage 51 that provides for the flow of hot water from the hot water chamber 3 into the mixing chamber 45. Also, formed in the plug is a coaxial passage 53 that provides for inflow of cold water to the mixing chamber 45 from the cold water chamber 39. Fixed solidly to the valve nut 38, as a reduced continuation thereof, in the cold water valve 55 that fits rotatably and slidably within the passage 53 as best shown in Fig. 3. Set within the end surface of the valve adjusting nut 38 about the valve member 55 is a joint sealing washer 56 adapted to be closed in a water tight joint against the chamber wall about the entrance to the passage 53 thus to cut off all flow of cold water to the mixing chamber from chamber 39. The valve 55 is formed in its outside surfaces with a plurality of longitudinal channels 57 which lead from the end of the valve, flush with the washer 56 to near the outer end of the valve. When the valve nut is rotatably adjusted to its inner limit of travel it seats the washer 56 against the chamber wall and thus closes off flow of cold water through the channels 57 into the mixing chamber, but when it is rotatably adjusted so as to unseat the washer 56 from the chamber wall, then water may flow through the channels 57 into the mixing chamber. However, when the valve nut approaches its outer limit of adjustment the valve members 55 will have been shifted to such extent that the inner ends of the passages 57 therein will be inside the passage 53 and the flow of cold water to the mixing chamber will be cut off. Thus it will be undertsood that, by the rotatable adjustment of the handle member 36, cold water in a predetermined amount may be admitted to the mixing chamber 45.

Slidably fitted in the passage 51 that connects the hot water chamber 3 with the mixing chamber 45 is a hot water valve 60. This comprises a plug fitted for longitudinal movement in the passage and formed in its side surfaces with longitudinal channels 61 through which water may flow, and equipped at its outer end with a valve head 62 equipped with sealing gaskets 62' that may be seated against the end of the plug about the entrance to the passage 51 to cut off any inflow of water to the mixing chamber. A coiled spring 65 contained in the chamber 3 bears against the valve head to urge the latter to its closed position.

At its inner end the hot water valve member 60 is formed with a tapered extension 68 that, as seen in Fig. 1, projects into a socket 69 formed in the end of a valve operating screw 70. This screw is disposed coaxial of the plug and has one end portion thereof slidably splined, as at 71 in Fig. 3 within the cold water valve member 55 and has its socketed end portion threaded through a spider 72 formed integral with the plug and within the mixing chamber; this threaded connection being opposite the threading of the valve adjusting nut 38 so that when the nut 38 is rotated in a direction to move it away from its seat to admit cold water to chamber 45 the screw 70 will be caused to move toward the hot valve, to unseat it and admit hot water.

When the cold valve is tightly closed there will be some clearance between the base of socket 69 and the end of the valve member 68. When the nut 38 is rotated to an extent that causes the cold valve passage to be opened and cold water permitted to flow into the mixing chamber, then its farther outward adjustment will cause the adjusting screw 70 to operatively engage the hot water valve in such manner that farther opening of the cold water valve results in a coincident pushing of the hot water valve head from its seat for the admission of hot water through the passage 51 into the mixing chamber.

When the cold water finally shuts off due to that continued outward adjustment of the valve that causes the inner ends of the valve channels 57 to be closed by movement into passage 53, then only hot water will be admitted to the mixing chamber. Then, in turning the handle in an opposite direction for adjusting the valves from this full open position of the hot water valve, toward closing position the hot water flow is first cut down, then cold water is again admitted to the mixing chamber with the diminishing inflow of hot water, then the hot water inflow is closed off and finally the cold water is cut off by the seating of the nut washer 56 against the chamber wall about the passage 53.

As to details of construction, it has been shown in Fig. 1 that the spud 25 is formed between its ends with an annular flange 25x that is held between sealing gaskets 75 and 76 that are held between the end of the housing and fitting 26. Also, a packing 77 is applied about the stem 35 within the spud and this is held by a nut 78 that is threaded into the spud against the packing.

A general description of use of the valve would be as follows: Assuming a person desires to take a tub bath, the valve plug 20 would first be rotated by means of the hand lever 30 to a position that would bring outlet 46 of the mixing chamber 45 into registration with the opening 16 leading to the tub connection 12 as in Fig. 2. Then by rotating the handle 36 in a counter clockwise direction the valve nut 38 will be unseated and the cold water valve opened, will be moved toward open position allowing cold water to flow into the mixing chamber and from this into the tub. By a continued turning of the handle 36 the hot water valve will subsequently, be caused to move from a closed position toward its open position and hot water will be admitted into the mixing chamber in an increasing amount in accordance with the opening of the valve, thus a water mixture of desired temperature may be obtained. If the handle 36 is continued to be turned in this counter clockwise direction, until it approaches near its limit in this direction, then the cold water will have been shut off and only hot water admitted to the mixing chamber.

Assuming that a mixture of desired temperature has been produced by the mixing of hot and cold water, the volume delivered to the tub may be increased or decreased by the rotatable adjustment of the plug that moves the outlet from the mixing chamber more or less into registration with the outlet 16.

If a shower bath is desired, the user would first adjust the valve mechanism to obtain the desired water temperature as above described, allowing the water to run into the tub until after the testing of temperature had been made and established, then by means of the hand lever 30 the valve plug would be rotated through a half turn bringing the outlet of the mixing chamber into registration with the housing outlet 17 and shower head connection. If more or less volume is desired, this would be affected by adjusting the plug to bring the mixing chamber outlet more or less into registration with the opening 17. Should it be desired at any time to temporarily cut off the water flow to the shower, this could be done by turning the plug through approximately a quarter turn so that the mixing chamber outlet would be covered by the valve housing, then when use of the shower is to be resumed, the plug would be rotated back to discharge position and the same temperature of water would be discharged without requiring any resetting of the hot and cold water valves.

One of the advantages of the present mixing valve mechanism resides in the fact that a mixture may be shut off at any time without changing valve setting. Furthermore, a thorough mixing of hot and cold water is obtained by reason of the jet-like streams of water that are projected into the mixing chamber through the channels of the hot and cold water valves.

While I have described the device as being a mixing valve in combination with a diverter, it is readily apparent that the mixing features might be employed independently of the diverter valve mechanism. The mixer and diverter mechanism is especially adapted to shampoo and lavoratory basins, to kitchen sinks, laundry trays, and other adaptations.

Having thus described my invention, what I claim as new therein and desire to secure by Letters Patent is:

1. A mixing valve comprising a housing having a valve plug chamber with hot and cold water inlets at longitudinally spaced locations and having an outlet, a valve plug rotatably fitted in said chamber and formed with an internal mixing chamber with a lateral outlet adapted, by rotative adjustment of the plug, to be adjusted into and from registration with the valve plug chamber outlet, and having separate passages therein for the inflow of water from the housing inlets into the mixing chamber, a valve member associated with each of said passages, a manual means operable to adjust one of said valves in one direction first to gradually open its passage and then to close it, and other means operable incident to and by such adjustment of said first valve to actuate the second of said valves from a fully closed to fully opened position, opening after the first valve has been partly opened and reaching its full open position as the first valve reaches its closed position.

2. A mixing valve comprising a housing having a valve plug chamber with hot and cold water inlets at longitudinally spaced locations and having an outlet, a valve plug rotatably fitted in said chamber and formed with an internal mixing chamber with a lateral outlet adapted, by rotative adjustment of the plug, to be adjusted into and from registration with the valve plug chamber outlet, and having separate passages therein for the inflow of water from the housing inlets into the mixing chamber, a valve in each of said passages, means connected directly with the first of said valves for effecting a positive adjustment thereof in one direction from closed to open and again to closed position and means effecting a lost motion connection between the valves by reason of said movement of the first valve whereby the second of said valves will be caused to open after the first valve has been opened and to reach its full open position after the closing of the first valve.

3. A mixing valve comprising a housing having a valve plug chamber with hot and cold water inlets and an outlet, a valve plug rotatably fitted in the chamber and formed with an internal mixing chamber with a lateral outlet adapted, by rotative adjustment of the plug, to be moved into and from registration with the housing outlet to control outflow of the water mixture; said plug having separate passages therein providing hot and cold water connections between the housing inlets and the mixing chamber for all positions of adjustment of the plug, a valve in the cold water passage movable between limits of travel in an opening direction first to gradually open the passage and finally to close it, means for effecting a positive adjustment of said valve through the full travel in the said opening direction, a valve in the hot water passage, and a lost-motion means connecting the two valves and operated by the movement of the cold water valve in its opening direction to gradually adjust the hot water valve from its closed to its full open position, and whereby said hot water valve will be caused to open after the cold water valve has opened, and to reach its full open position after the cold water valve has closed its passage.

4. A mixing valve as in claim 3 wherein the adjustment of the cold water valve in the opposite direction between its limits of travel will cause the hot water valve to gradually move to a closing position and to gradually cut down the inflow of hot water and to close completely before the full closing of the cold water valve.

5. In a mixing valve, a member having a mixing chamber formed therein and having an outlet from said chamber and having separate hot and cold water inlet passages opening thereinto, a valve rotatably applied to the cold water passage and having a threaded connection with the said member and adjustable, by reason of its threaded connection, in closing and opening directions and whereby, when adjusted in its opening direction, it moves first to gradually open the passage and then to close it, a valve in the hot water passage, with yieldable means urging it to closed position, and a shaft coaxial of the cold water valve and adapted to rotate therewith, and having a threaded mounting in the said member to effect its endwise adjustment for a controlled opening and closing thereby of the hot water valve.

6. A mixing valve comprising a housing having hot and cold water inlets and having an outlet, a valve plug rotatably fitted in the housing and formed with an internal mixing chamber having an outlet adapted by rotative adjustment of the plug to be moved into and from registration with the housing outlet, and having passages therein providing communication between the hot and cold water inlets into said mixing chamber, a movable valve member in each of said passages for controlling inflow of water therethrough, means movable in one direction for actuating the first of said valve members from closed position gradually to fully opened position and then to close the passage, and means operable in accordance with the above movement of the said first valve for actuating the second valve from fully closed to fully opened position.

HARVEY A. PEARSE.

REFERENCES CITED

The following references are of record in the file of this patent:

UNITED STATES PATENTS

| Number | Name | Date |
| --- | --- | --- |
| 949,869 | White | Feb. 22, 1910 |
| 1,066,213 | Moore | July 1, 1913 |
| 1,517,990 | Hinkle | Dec. 2, 1924 |
| 1,624,479 | Delany | Apr. 12, 1927 |
| 1,807,081 | Bletcher | May 26, 1931 |

FOREIGN PATENTS

| Number | Country | Date |
| --- | --- | --- |
| 278,848 | Great Britain | of 1927 |